US009069572B2

(12) United States Patent
Wang et al.

(10) Patent No.: US 9,069,572 B2
(45) Date of Patent: Jun. 30, 2015

(54) REPLACEMENT OF INBOX DRIVER WITH THIRD PARTY DRIVER

(75) Inventors: Chun-Yi Wang, Taipei (TW); Terrill M. Moore, Trumansburg, NY (US)

(73) Assignee: PROLIFIC TECHNOLOGY INC., Taipei (TW)

( * ) Notice: Subject to any disclaimer, the term of this patent is extended or adjusted under 35 U.S.C. 154(b) by 276 days.

(21) Appl. No.: 13/560,161

(22) Filed: Jul. 27, 2012

(65) Prior Publication Data

US 2014/0033234 A1   Jan. 30, 2014

(51) Int. Cl.
*G06F 3/00* (2006.01)
*G06F 9/44* (2006.01)
*G06F 9/46* (2006.01)
*G06F 13/00* (2006.01)

(52) U.S. Cl.
CPC .................................. *G06F 9/4413* (2013.01)

(58) Field of Classification Search
CPC .................................................. G06F 9/4413
USPC ....................................................... 719/327
See application file for complete search history.

(56) References Cited

U.S. PATENT DOCUMENTS

| 7,082,598 B1 | 7/2006 | Le Cau et al. |
| 7,209,971 B1 | 4/2007 | Dabagh et al. |
| 7,779,425 B2 | 8/2010 | Pudipeddi et al. |
| 7,802,022 B2 | 9/2010 | Bhesania et al. |
| 2003/0140191 A1* | 7/2003 | McGowen et al. ........... 710/302 |
| 2010/0042987 A1 | 2/2010 | Yamada |
| 2012/0159010 A1 | 6/2012 | Jiang et al. |

FOREIGN PATENT DOCUMENTS

| EP | 2136310 | 12/2009 |
| WO | WO 2012/073126 | 6/2012 |

OTHER PUBLICATIONS

PCT Notification of Transmittal of the International Search Report and the Written Opinion of the International Searching Authority, or the Declaration, International Filing Date: Jul. 22, 2013, International Application No. PCT/US2013/051474, Applicant: MCCI Corporation, Date of Mailing: Oct. 22, 2013, pp. 1-12.

* cited by examiner

*Primary Examiner* — Timothy A Mudrick
(74) *Attorney, Agent, or Firm* — McClure, Qualey & Rodack, LLP

(57) ABSTRACT

Embodiments efficiently replace an inbox driver of a computer with a third party driver. The inbox and third party drivers are function drivers configured to service an external device connected to the computer. A Function Loader driver is installed within the computer to enable replacement of the inbox function driver with the third party function driver based on a highest ranking of matching criteria. The Function Loader driver cooperates with a Function Loader Child driver, which intercepts a packet exchange that pertains to the external device to determine whether specified rules for replacement are satisfied. If so, the Function Loader Child driver modifies content of the packet exchange to uniquely identify the third party function driver as having the highest ranking of matching criteria. Accordingly, the operating system recognizes the third party function driver as a preferred driver for servicing the external device and installs the third party driver.

19 Claims, 3 Drawing Sheets

REPLACEMENT OF INBOX DRIVER WITH THIRD PARTY DRIVER

BACKGROUND

1. Technical Field

The present disclosure relates generally to drivers of computer operating systems and, more specifically, to replacement of an inbox driver of an operating system with a third party driver.

2. Background Information

An external device may be connected to a computer via a port, such as an input/output (I/O) port of a host controller and, in response, one or more drivers, i.e., software programs or processes executing on the computer, may be provided to allow the device to interact with other processes executing on the computer. Examples of a driver may include a bus driver, a function driver and, optionally, a bus filter driver. Broadly stated, the bus driver may be provided to control operation of (i.e., "service") a bus, such as the host controller, as well as to detect and report characteristics of the external device connected to the port of the controller. The function driver may be provided to service the external device, whereas the bus filter driver may be provided to support the external device through enhanced features or functionality.

In addition, the driver may be an inbox driver that is embedded, i.e., previously installed, within an operating system of the computer. An example of an inbox driver may be an inbox class function driver that is provided to service a certain class of devices, e.g., a mass storage class that includes external storage devices, such as thumb drives and/or hard disk drives. Often, there may be a need to replace the inbox (class) function driver with a third party function driver that, e.g., may have higher performance than the inbox driver.

However, many operating systems currently do not have a mechanism or procedure that is permanent and safe to perform such driver replacement. Typically when an attempt is made to replace an inbox function driver with a third party function driver, the operating system may issue a warning that the attempted driver replacement may not be optimally or even suitably compatible with the external device and/or operating system because, e.g., the replacement driver does not have a preferred matching or ranking compared to that of the inbox driver. Thus, there is a need to ensure device and/or operating system compatibility and performance with a replacement driver of a computer.

SUMMARY

One or more embodiments described herein efficiently replaces an inbox driver of a computer with a third party driver. Illustratively, the inbox and third party drivers are function drivers configured to service an external device connected to the computer. A first bus filter driver, i.e., a Function Loader driver, is installed within an operating system of the computer to enhance functionality of the system. The Function Loader driver illustratively enhances the functionality to enable replacement of the inbox function driver with the third party function driver based on a highest ranking of matching criteria. To that end, the Function Loader driver cooperates with a second bus filter driver, i.e., a Function Loader Child driver, which is configured to support the external device by intercepting and examining a packet exchange that pertains to the external device so as to determine whether specified rules for replacement are satisfied. If so, the Function Loader Child driver modifies content of the packet exchange to uniquely identify the third party function driver as having the highest ranking of matching criteria. Accordingly, the operating system recognizes the third party function driver, rather than the inbox driver, as a preferred driver for servicing the external device and thus installs the third party driver.

Advantageously, installation of the Function Loader driver prior to the packet exchange pertaining to the external device enables the Function Loader Child driver to modify the content of the packet exchange so as to uniquely identify the third party function driver as the preferred function driver. This, in turn, enables the operating system to securely and seamlessly authenticate and load the third party function driver, instead of the inbox driver, to service the device.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

DETAILED DESCRIPTION OF ILLUSTRATIVE EMBODIMENTS

Figure 1:
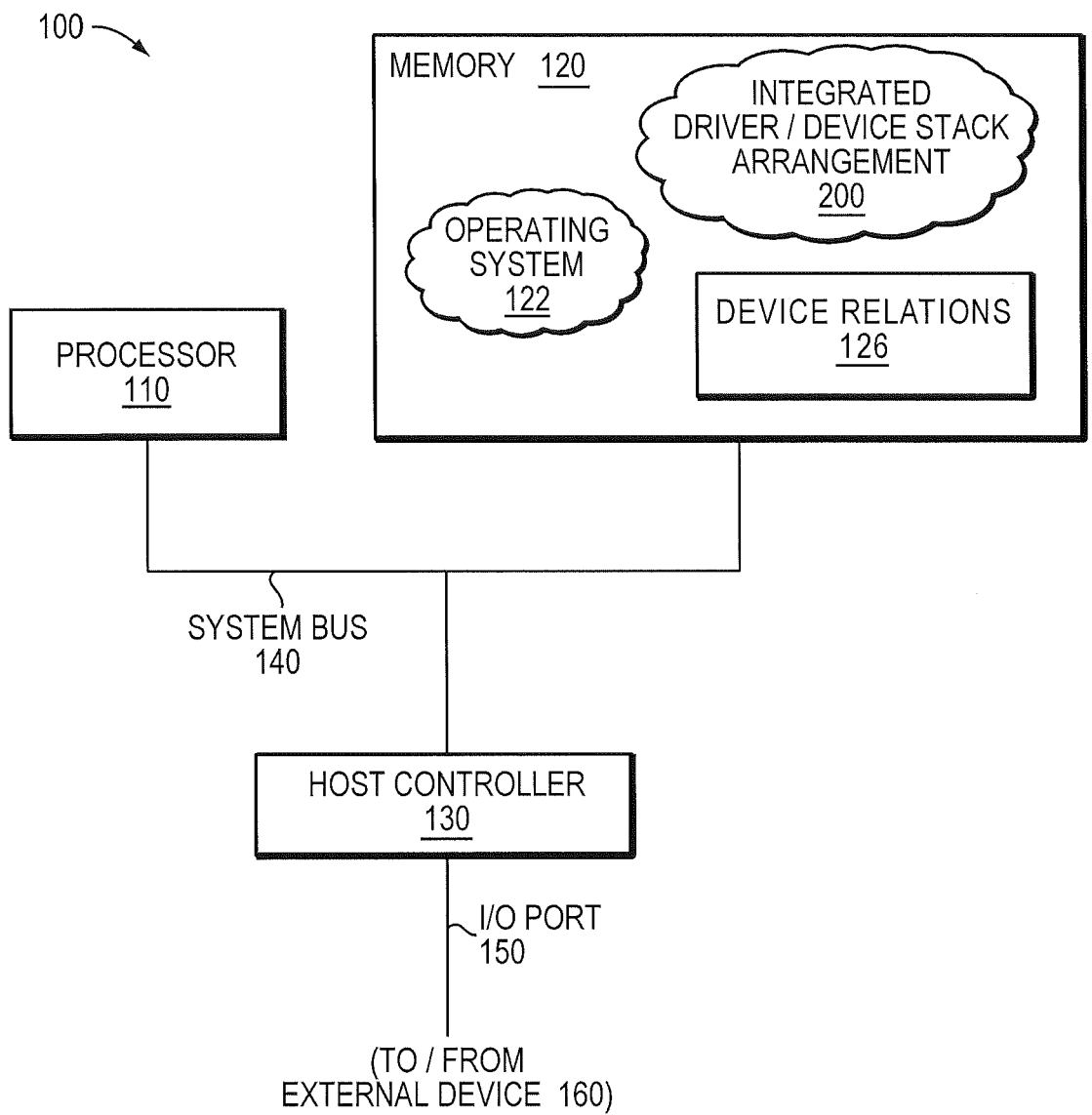
FIG. 1 is a schematic block diagram of a computer.

FIG. 1 is a schematic block diagram of a computer that may be advantageously used with one or more embodiments described herein as, e.g., a personal computer. Illustratively, the computer may be embodied as a Universal Serial Bus (USB) host system 100 that includes a processor 110, memory 120 and a host controller 130, e.g., a USB host controller, interconnected by a system bus 140. The host controller 130 contains the mechanical, electrical and signaling circuitry needed to connect the host system 100 to external devices 160, e.g., USB external devices, coupled to one or more I/O ports 150, e.g., a USB port. To that end, the host controller 130 provides a hardware interface for the external devices 160, which may include a keyboard, mouse, mass storage, digital camera as well as many other types of devices.

The memory 120 may include a plurality of locations that are addressable by processor 110 for storing software programs and data structures associated with the embodiments described herein. The processor 110 may include logic adapted to execute the software programs and manipulate (i.e., control) the data structures, such as a Device Relations 126 data structure. An exemplary processor 110 may include single or multi-core Central Processing Unit (CPU), Graphics Processing Unit (GPU), Field Programmable Gate Array (FPGA) and/or Application Specific Integrated Circuit (ASIC).

An operating system 122, portions of which are typically resident in memory 120 and executed by the processor 110, functionally organizes the host system 100 by, inter alia, invoking operations in support of software programs, including processes and/or applications, executing on the host system. The operating system 122 is illustratively organized as a series of software layers including protocol stacks organized as, e.g., driver and/or device stacks. A suitable operating system 122 may include the Windows® series of operating systems from Microsoft Corp. of Redmond, Wash., the Linux® operating system, the MAC OS® series of operating systems from Apple Inc. of Cupertino, Calif., and the UNIX® series of operating systems, among others. The software processes/applications may include various processes and/or applications associated with an integrated driver/device stack arrangement 200 and, as such, contain computer executable instructions executed by processor 110 of host system 100 to perform functions described herein.

It will be apparent to those skilled in the art that other types of processors and memory, including various tangible, non-transitory computer-readable media, may be used to store and execute program instructions pertaining to the system described herein. Also, while the embodiments herein are described in terms of software processes and/or applications stored in memory, alternative embodiments also include those processes and/or applications being embodied as modules consisting of hardware, software, firmware, or combinations thereof.

In one or more embodiments, the software processes and/or modules, including the drivers, described herein may be implemented as separately-scheduled processes within the host system 100; however, in an alternate embodiment, the modules may be implemented as pieces of code within a single process. Communication between the modules of the host system 100 may thus illustratively be effected through the use of message passing, shared memory or remote procedure calls (RPCs) between the modules. A suitable message passing, shared memory and/or RPC mechanism provided by the operating system 122 to transfer information between modules (processes) is the Inter Process Communication (IPC) mechanism.

A user of computer 100 may connect an external device 160, such as a storage device, to the I/O port 150 of the computer by, for example, inserting a connection/cable from the device into the port of the computer 100. In response, the operating system 122, such as the Windows operating system, may "automatically" install an appropriate inbox function driver to service the external device. Broadly stated, connection of the external storage device 160 to the computer (via the port) may be recognized by an operating system process, e.g., a Plug and Play (PnP) manager, by, e.g., retrieving and authenticating a certification, such as a hardware identification (ID), associated with the device to determine whether the device is approved by the operating system. Upon approval, the manager may select and load the appropriate inbox function driver. Selection of the driver may be determined using a highest rank based on matching criteria for the storage device.

However, there may be a need to replace the inbox function driver with a third party function driver that has higher performance than the inbox function driver. The function drivers may belong to a certain class of devices, e.g., a mass storage class that includes external storage devices, such as thumb drives and/or hard disk drives. When an attempt is made to replace an inbox function driver with a third party function driver, the operating system may issue a warning that the attempted driver replacement may not be optimally or even suitably compatible with the external device and/or operating system because, e.g., the replacement driver does not have a preferred matching or ranking compared to that of the inbox driver. Thus, there may be a need to ensure device and/or operating system compatibility and performance with a replacement driver of a computer.

Figure 2:
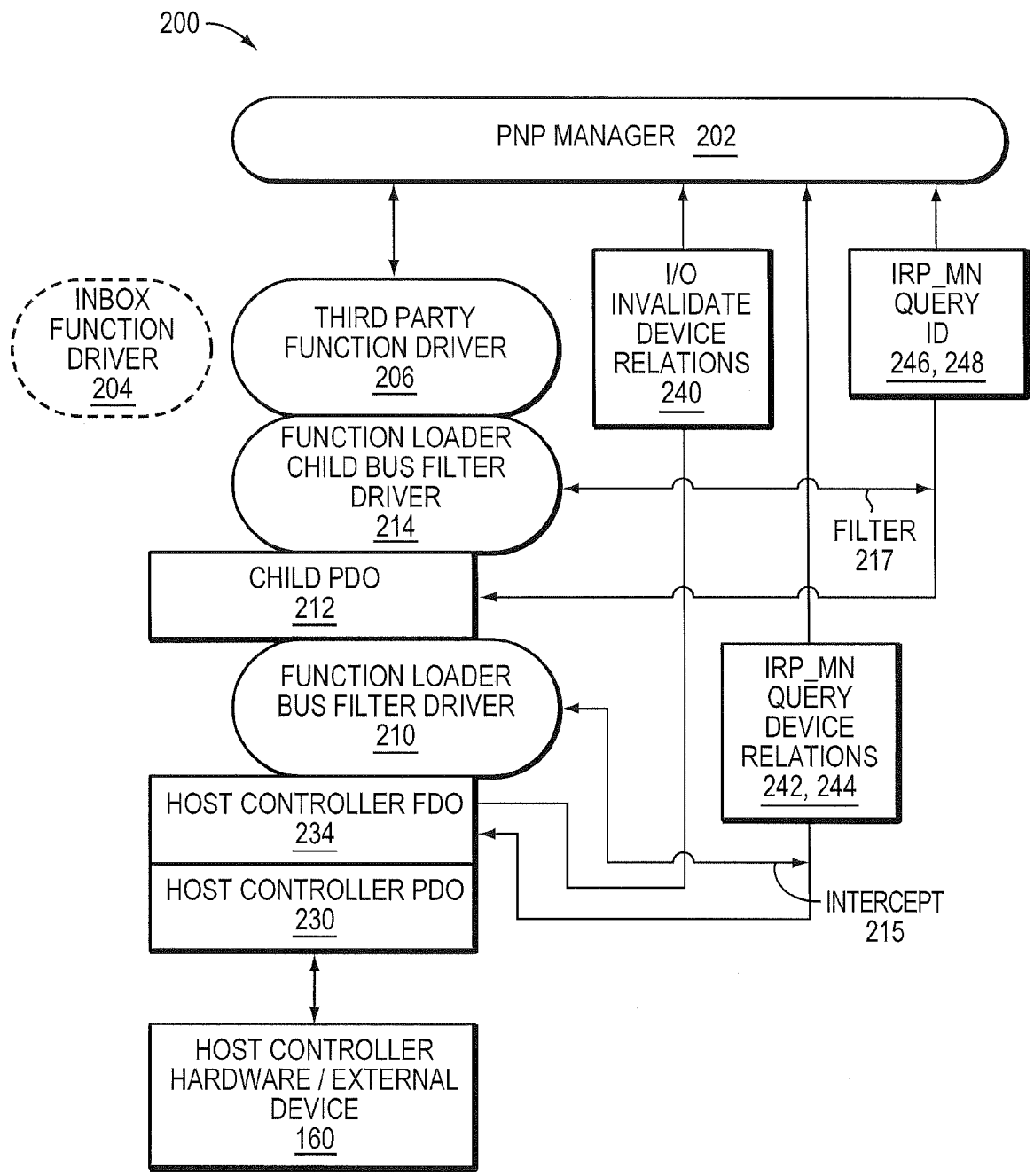
FIG. 2 is a schematic block diagram of an integrated driver/device stack arrangement.

FIG. 2 is a schematic block diagram of the integrated driver/device stack arrangement 200. In one or more embodiments described herein, a first bus filter driver, i.e., a Function Loader bus filter driver 210, is installed within the operating system to enhance functionality of the system. Illustratively, the Function Loader bus filter driver 210 (hereinafter "Function Loader driver 210") enhances the functionality to enable replacement of an inbox driver associated with an external device 160 connected to the I/O port 150 of the computer. That is, the Function Loader driver 210 is configured to add enhancements so that the inbox driver, e.g., an inbox function driver 204, of the operating system 122 can be replaced by a third party function driver 206, based on a highest ranking of matching criteria.

To that end, the Function Loader driver 210 spawns (generates) and cooperates with a second bus filter driver, i.e., a Function Loader Child bus filter driver 214, which is configured to support the external device 160 by, e.g., intercepting and examining a packet exchange that pertains to the external device 160 so as to determine whether specified rules for replacement are satisfied. If so, the Function Loader Child bus filter driver 214 (hereinafter "Function Loader Child driver 214") modifies content of the packet exchange to uniquely identify the third party function driver 206 as having the highest ranking of matching criteria. Accordingly, the operating system 122 (i.e., PnP manager 202) recognizes the third party function driver 206, rather than the inbox function driver 204, as a preferred driver for servicing the external device 160 and thus installs the third party function driver 206.

In an embodiment, the Function Loader driver 210 may be installed as a first upper filter bus driver of the operating system 122. The Function Loader Child driver 214 may be installed as a second upper filter bus driver and, as such, may be illustratively disposed over the Function Loader driver 210 and a Child physical device object (PDO) 212, as shown in the integrated driver/device stack arrangement 200. In addition, the Function Loader driver 210 may be logically disposed over a host controller function device object (FDO) 234 and a host controller PDO 230 of the arrangement 200. As will be understood to those skilled in the art, the host controller FDO illustratively "represents" (i.e., stores information, such as characteristics, that describe) the I/O port 150, whereas the host controller PDO 230 represents the host controller 130 and the Child PDO 212 represents the external device 160 connected to the I/O port 150.

As noted, the PnP manager 202 of the operating system 122 may recognize the external device 160 based on its hardware ID. When the external device 160 is connected to the I/O port 150 of the computer 100, the Child PDO 212 illustratively generates and reports the hardware ID for the device to the PnP manager 202. The hardware ID may be generally embodied as a string of elements having a form of:

[Bus Type][deliminator][Unique Device ID]

where [Bus Type] may be, e.g., USB or PCI, and [Unique Device ID] may be a combination of unique vendor identifier and device identifier, and/or device revision and/or serial number. This type of string may be generated for each external device connected to the I/O port 150. For a USB implementation, there may be compatible IDs which indicate the USB class to which the device belongs. In particular, there may be a specific class and subclass for various storage devices; for example, there may be a USB mass storage device class for storage devices such as a flash drive, a thumb drive and an external hard drive. Class information may be used to identify each device's functionality and typically includes class, subclass and protocol information.

In an embodiment, the PnP manager 202 attempts to match the ID associated with the external device, e.g., the hardware ID, as reported by the Child PDO 212 with an ID associated with an inbox (storage) driver, such as inbox function driver 204, of the operating system 122. Illustratively, the ID associated with the inbox driver is substantially equivalent to the hardware ID associated with the external device. In other words, the PnP manager 202 may compare the hardware ID information as first criteria, as well as compatible ID information as secondary criteria, reported for the connected external device 160 to such information associated with a list of inbox drivers to select a driver having a preferred matching. The preferred matching and, thus, a higher ranking for the selected driver is achieved by matching on all elements of the ID string associated with the external device, e.g., the hardware ID (as well as the compatible ID, if appropriate). Therefore, to replace an inbox driver, a third party (function) driver may have a higher rank of "matching criteria" than the inbox driver, which usually matches on compatible ID as it has to operate with all devices of a certain function class (such as USB mass storage, webcam, etc.).

Operationally, upon recognizing the presence of the external device 160 connected to the I/O port 150, the host controller FDO 234 may issue (implement) a system call through the operating system 122 (e.g., to the PnP manager 202) identifying a device change, e.g., the presence of the new external device. In one or more embodiments described herein, the host controller FDO 234 may recognize the presence of the connected external device through, e.g., interrupt and register operations and, in response, implements the system call in the form of, e.g., an IoInvalidateDeviceRelations routine 240 to the PnP manager 202. This routine informs the PnP manager that there is new external device 160 connected to the I/O port 150 and that the manager 202 should request updated information from the host controller FDO 234. In response, the PnP manager 202 may query the updated information by transmitting an I/O request message or packet, e.g., an IRP_MN_QUERY_DEVICE_RELATIONS packet 242, directed to the host controller FDO 234. The IRP_MN_QUERY_DEVICE_RELATIONS (hereinafter "Query Relations") packet 242 illustratively requests relations information about the newly connected external device 160.

Upon receiving the Query Relations packet 242, the host controller FDO 234 may cooperate with, e.g., the host controller 130 and Child PDO 212 to interrogate the newly connected external device 160 and perform bus enumeration As used herein, bus enumeration includes retrieving information from the external device 160, e.g., a PnP-compatible device, needed to, e.g., generate the hardware ID string. The host controller FDO 234 may then load the requested relations information into, e.g., an I/O status block field of a return Query Relations packet 244 and send the return Query Relations packet 244 with the requested relations information to the PnP manager 202. Illustratively, the requested relations information includes at least an indication of the Child PDO 212 by way of a device object pointer (e.g., PDevice_Relations pointer) in the I/O status block of the return Query Relations packet 244. In an embodiment, the pointer references a location of a data structure, e.g., the Device Relations 126 data structure, where the requested relations information is stored in memory 120. In other words, the requested relations information includes the device object pointer that references a location of the Child PDO 212 in memory 120. The Function Loader driver 210 illustratively intercepts (depicted as line 215) the return Query Relations packet 244 and records the requested relations information, including the device object pointer for the Child PDO 212 enumerated in the return Query Relations packet 244.

In an embodiment, the Function Loader driver 210 may then attach the Function Loader Child driver 214 to the reported Child PDO 212 by implementing a system call in the form of, e.g., an IoAttachDeviceToDeviceStack routine (not shown) to the PnP manager 202. Illustratively, the Function Loader Child driver 214 attaches to (i.e., becomes associated with) the Child PDO 212 by recording the device object pointer that references the Child PDO 212. Attachment of the Function Loader Child driver 214 to the Child PDO 212 enables the Function Loader Child driver 214 to intercept and examine any subsequent packets issued by the PnP manager 202 that pertain to the Child PDO 212. Thus, if the PnP manager 202 issues (transmits) a packet pertaining to the Child PDO 212, the Function Loader Child bus filter driver 214 may intercept and examine that transmission to decide whether it will service (i.e., respond to) the packet.

For example, assume the PnP manager 202 transmits an IRP_MN_QUERY_ID packet 246 to the Child PDO 212. Illustratively, the IRP_MN_QUERY_ID (hereinafter "Query ID") packet 246 requests the hardware ID associated with the Child PDO 212 representing the external device 160. The Function Loader Child driver 214 may intercept and examine the Query ID packet 246, and thereafter decide not to service it. Accordingly, the Function Loader Child driver 214 passes the Query ID packet 246 to the Child PDO 212. The Child PDO 212 may respond to the Query ID packet by, e.g., loading the hardware ID string into the I/O status block prior to sending a return Query ID packet 248 to the PnP manager 202. On the return path to the PnP manager, the Function Loader Child driver 214 may intercept and examine (i.e., filter) the return Query ID packet 248 (as depicted by line 217), and decide to service the packet by, e.g., determining whether the query ID content (e.g., the hardware ID) contained in the packet satisfies the specified rules for replacement.

In one or more embodiments, the specified rules may state, e.g., that the Function Loader Child driver 214 may replace any inbox (e.g., class function) driver 204 for a storage (class) device with the third party function driver 206. Note that another class device, such as a webcam, joystick or keyboard, may not meet the specified rules for replacement and, thus, the embodiments described herein may not replace the inbox class function driver. However assume that upon examining the return Query ID packet 248, the Function Loader Child driver 214 determines that the rules for replacement are satisfied, i.e., that the newly connected external device 160 is a storage class device. The Function Loader Child driver 214 thus modifies the content of the I/O status block of the return Query ID packet 248 by, e.g., inserting a "unique" ID that is associated with the third party function driver 206. Illustratively, the unique ID alters the hardware ID string provided by the I/O bus driver 220 by, e.g., replacing that string with a specified Global Unique ID (GUID) that may take the form of a hex (0-9 and A-F) string. The uniqueness of the GUID also obviates any potential conflict of IDs. The Function Loader Child driver 214 then passes the return Query ID packet 248 (with modified content) to the PnP manager 202.

Upon receiving the return Query ID packet 248, the PnP manager 202 attempts to match the modified content of the packet 248 with the ID associated with the operating system's inbox storage function drivers, as well as the unique ID associated with the third party function driver. Because none of the inbox drivers can match the modified content (i.e., the unique ID) as precisely as the third party function driver, the PnP subsystem 202 loads/installs the third party function driver 206, thereby essentially replacing the inbox (class function) driver 204 which, illustratively, only matches against the compatible ID at a lower ranking. That is, the third party function driver 206 is installed because only that driver can satisfy the preferred matching or highest ranking criteria at the hardware ID level. Any subsequent packet issued by the PnP manager (or other operating system component) and pertaining to the newly connected external device 160 with the unique ID may be serviced by the third party function driver 206.

Figure 3:
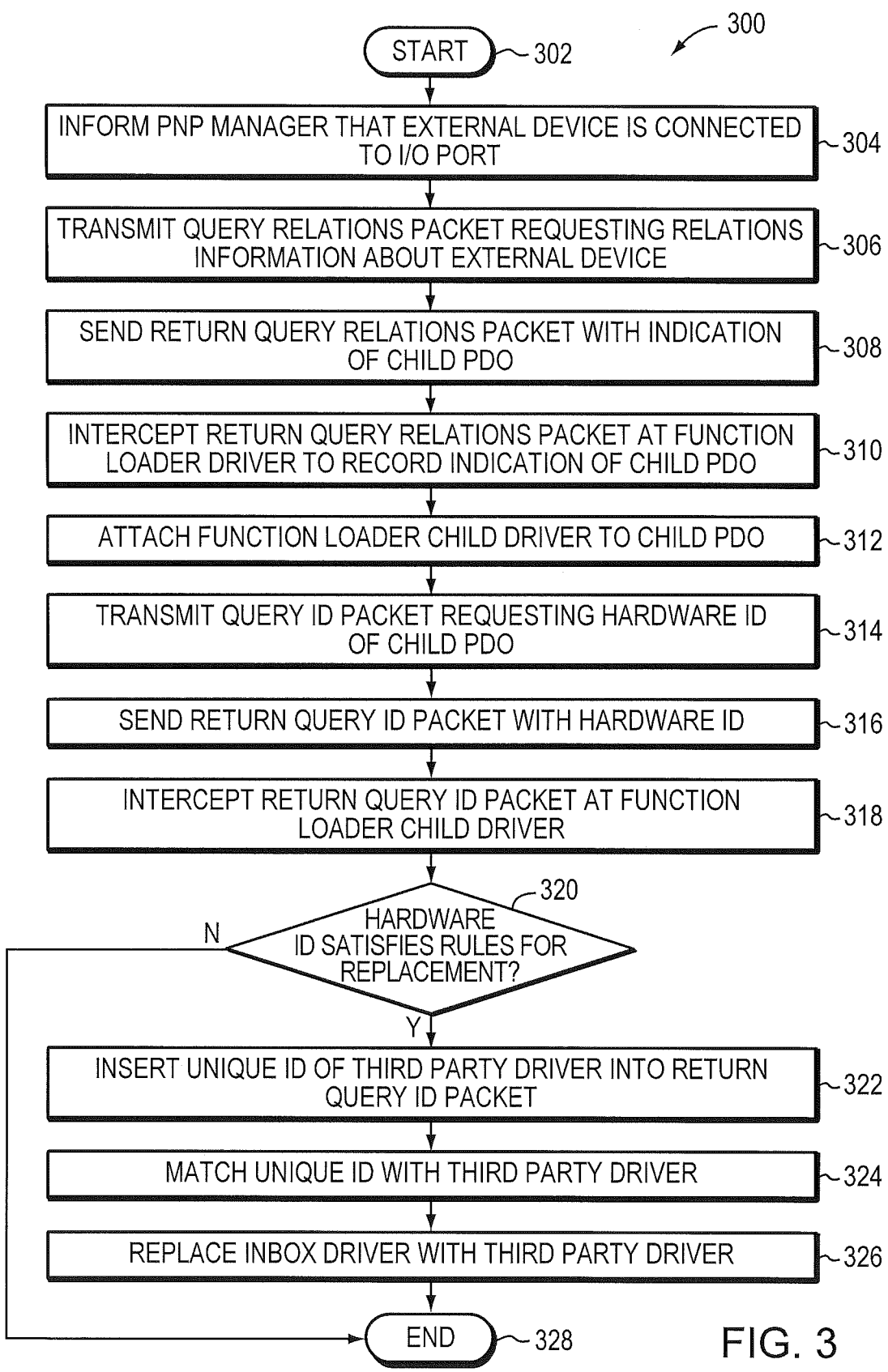
FIG. 3 illustrates a simplified procedure for replacing an inbox driver of a computer with a third party driver.

FIG. 3 illustrates a simplified procedure for replacing an inbox driver of a computer with a third party driver. As noted, the inbox and third party drivers are illustratively function drivers configured to service an external device, such as a storage device, connected to the I/O port of the computer. The procedure 300 starts at block 302 and proceeds to block 304 where, in response to recognizing the presence of the external device, the host controller FDO informs the PnP manager that the external device is connected to the I/O port by, e.g., calling the IoInvalidateDeviceRelations routine. At block 306, the PnP manager transmits the Query Relations packet to the host controller FDO requesting relations information about the newly connected external device. At block 308, the host controller FDO sends the return Query Relations packet with the requested relations information, which includes at least an indication of the Child PDO.

At block 310, the Function Loader driver intercepts the return Query Relations packet to record the requested relations information, including the indication of the Child PDO, prior to passing the packet to the PnP manager. At block 312, the Function Loader driver attaches the Function Loader Child driver to the Child PDO and, at block 314, the PnP manager transmits the Query ID packet to the Child PDO requesting the hardware ID associated with the Child PDO. At block 316, the Child PDO sends the return Query ID packet with the hardware ID to the PnP manager. At block 318, the Function Loader Child driver intercepts the return Query ID packet and, at block 320, determines whether the hardware ID satisfies the rules for replacement. If not, the procedure ends at block 328.

However, if the hardware ID satisfies the rules for replacement, then (at block 322) the Function Loader Child driver inserts a unique ID associated with the third party function driver into the return Query ID packet prior to passing the return Query ID packet (with unique ID) to the PnP manager. At block 324, the PnP manager matches the unique ID with the third party function driver and, accordingly, installs the third party function driver, thereby essentially replacing the inbox (class function) driver with the third party (function) driver at block 326. The procedure then ends at block 328.

While there has been shown and described illustrative embodiments configured to efficiently replace an inbox driver of a computer with a third party driver, it is to be understood that various other adaptations and modifications may be made within the spirit and scope of the embodiments herein. For example, the embodiments described herein may apply to installation of any class filter driver (e.g., USB class filter driver, PCI class filter driver, etc) to which the PnP manager is instructed to attach to an external device which reports itself as belonging to a specific class. However, a problem with such installation is that the newly connected external device typically first reports itself as belonging to a specific class before the appropriate filter driver is installed. That is, the newly connected external device typically first reports itself as belonging to a specific class as part of the Query ID/return Query ID packet exchange.

As described herein, installation of an optional bus filter driver, such as the Function Loader Child driver, enables the operating system to securely and seamlessly authenticate and load a third party function driver, instead of an inbox function driver, to service an external device. Yet, installation of such a filter driver is typically dependent on whether the driver is a class filter driver or a bus filter driver, and the PnP manager typically makes this determination based on the results of the Query ID/return Query ID packet exchange. Accordingly, the bus filter driver is typically not installable until after the packet exchange, and thus would be unavailable to intercept and examine the Query ID/return Query ID packet exchange to provide the modified content needed for installation of the third party function driver.

The embodiments described herein address this problem by enabling installation of the Function Loader driver and attachment of the Function Loader Child driver to the Child PDO prior to the Query ID request arriving at the Child PDO so that the Function Loader Child driver may return the modified content (unique ID) of the Query ID packet exchange. It should be noted that installation of the Function Loader driver prior to the Query ID/return Query ID packet exchange is achieved by way of, e.g., a conventional operating system method for installing class filter drivers for certain device classes. For example, the Windows operating system provides registry keys (e.g, Upper Filter and Lower Filter) with a key string value of the filter driver name (e.g., the Function Loader driver) so that the driver can be pre-inserted into a class category. When the appropriate key is presented, the operating system loads the filter driver along with all other drivers in the class.

In one or more embodiments, by providing the Function Loader driver as an upper bus filter driver, the embodiments described herein alter the procedure or protocol for authenticating and loading drivers for particular devices to securely and seamlessly enable loading of a third party driver instead of the inbox driver. As described herein, the Function Loader Child driver modifies the ID content of the return Query ID packet by inserting the unique ID which can only be optimally matched by the third party (function) driver, and not the inbox (function) driver, thus avoiding the operating system warning.

Advantageously, installation of the Function Loader driver prior to the packet exchange pertaining to the external device enables the Function Loader Child driver to modify the content of the packet exchange so as to uniquely identify the third party function driver as the preferred function driver. This, in turn, enables the operating system to securely and seamlessly authenticate and load the third party function driver, instead of the inbox driver, to service the device.

The foregoing description has been directed to specific embodiments and, thus, the description is to be taken only by way of example and not to otherwise limit the scope of those embodiments. Therefore, it is an object of the appended claims to cover all variations and modifications as come within the true spirit and scope of the embodiments herein.

What is claimed is:

1. A system comprising:
   a first bus filter driver installed within an operating system of a computer to enable replacement of an inbox driver of the computer with a third party driver based on a highest ranking of matching criteria, the third party driver configured to service an external device connected to the computer, and
   a second bus filter driver cooperating with the first bus filter driver to intercept and examine a packet exchange that pertains to the external device so as to determine whether specified rules for replacement are satisfied, the packet exchange includes hardware identification (ID) associated with the external device and device class compatible ID associated with the external device, the second bus filter driver further configured to modify content of the packet exchange to uniquely identify the third party driver as having the highest ranking of matching criteria when the specified rules for replacement are satisfied, such that the operating system installs the third party driver rather than the inbox driver as a preferred driver for servicing the external device, wherein the device class compatible ID remains unmodified.

2. The system of claim 1 wherein the hardware ID is chosen from a group consisting of unique vendor identifier, a revision number associated with the external device, a serial number associated with the external device, and combinations thereof.

3. The system of claim 1 wherein the external device is a Universal Serial Bus (USB) device.

4. The system of claim 1 wherein the second bus filter driver is configured to modify the content of the packet exchange by replacing the hardware ID with a unique ID associated with the third party driver.

5. The system of claim 4 wherein the unique ID comprises:
a Global Unique ID having a form of a hex string.

6. The system of claim 1 wherein the specified rules for replacement are satisfied when the external device is a storage class device.

7. The system of claim 1 wherein the specific rules for replacement are not satisfied when a device class of the third party driver differs from the device class compatible ID.

8. The system of claim 1 wherein the packet exchange includes an IRP_MN_QUERY_ID packet having the hardware ID and device class compatible ID.

9. The system of claim 1 wherein the device class compatible ID identifies functionality of the external device including subclass and protocol information.

10. The system of claim 1 wherein the matching criteria include matching the hardware ID and the device class compatible ID.

11. A system configured to replace an inbox function driver of a computer with a third party function driver comprising:
a Function Loader driver installed within an operating system of a computer to enable replacement of the inbox function driver of the computer with a third party function driver based on a highest ranking of matching criteria, the third party function driver configured to service a storage device connected to the computer, and
a Function Loader Child driver cooperating with the Function Loader driver to intercept and examine a packet exchange that pertains to the storage device so as to determine whether specified rules for replacement are satisfied, the packet exchange including hardware identification (ID) associated with the storage device and device class compatible ID associated with the storage device, the Function Loader Child driver further configured to modify content of the packet exchange to uniquely identify the third party function driver as having the highest ranking of matching criteria when the specified rules for replacement are satisfied, such that a Plug and Play (PnP) manager of the operating system installs the third party function driver rather than the inbox function driver as a preferred driver for servicing the storage device, wherein the device class compatible ID remains unmodified.

12. The system of claim 11 wherein the hardware ID is chosen from a group consisting of unique vendor identifier, a revision number associated with the storage device, a serial number associated with the storage device, and combinations thereof.

13. The system of claim 11 wherein the storage device is a Universal Serial Bus (USB) device.

14. The system of claim 11 wherein the Function Loader Child driver is configured to modify the content of the packet exchange by replacing the hardware ID with a unique ID associated with the third party function driver.

15. The system of claim 14 wherein the unique ID comprises:
a Global Unique ID having a form of a hex string.

16. The system of claim 11 wherein the specified rules for replacement are not satisfied when a device class of the third party driver differs from the device class compatible ID.

17. The system of claim 11 wherein the packet exchange includes an IRP_MN_QUERY_ID packet having the hardware ID and device class compatible ID.

18. The system of claim 11 wherein the device class compatible ID identifies functionality of the storage device including subclass and protocol information.

19. The system of claim 11 wherein the inbox function driver only matches the device compatible class ID at a lower ranking of the matching criteria.

* * * * *